United States Patent

Lipp et al.

[15] 3,663,195
[45] May 16, 1972

[54] APPARATUS FOR AND METHOD OF ORIENTING CORDS IN A MOLTEN GLASS DOWNDRAW BOWL

[72] Inventors: George D. Lipp, Corning; Villem Rahe, Painted Post; Lawrence B. Roberts, Big Flats, all of N.Y.

[73] Assignee: Corning Glass Works, Corning, N.Y.

[22] Filed: May 18, 1970

[21] Appl. No.: 37,988

[52] U.S. Cl. ................................................65/132, 65/333
[51] Int. Cl. .........................................................C03b 5/26
[58] Field of Search ....................65/127, 129, 131, 132, 324, 65/333, 347, 126

[56] References Cited

UNITED STATES PATENTS 1,675,273   6/1928   Keller ........................................65/129

*Primary Examiner*—Arthur D. Kellogg
*Attorney*—Clarence R. Patty, Jr. and Burton R. Turner

[57] ABSTRACT

A directional vane is mounted in a predetermined position within the well or bowl of a molten glass delivery unit to intercept and collect surface cord at such predetermined location within the bowl, and deliver the surface cord in a desired orientation within the molten glass discharged from the delivery orifice. As the molten glass enters the bowl area of the delivery unit, the surface portion thereof which has a tendency to form a surface volatility cord in the delivered glass, flows into contact with opposite sides of the oriented vane and flows downwardly therealong exiting from the discharge orifice at the same angular position as the predetermined setting of the vane.

6 Claims, 5 Drawing Figures

PATENTED MAY 16 1972

INVENTORS.
George D. Lipp
Villem Rahe
Lawrence B. Roberts
BY
Burton R. Turner
ATTORNEY

APPARATUS FOR AND METHOD OF ORIENTING CORDS IN A MOLTEN GLASS DOWNDRAW BOWL

BACKGROUND OF THE INVENTION

The present invention pertains to the delivery of molten glass, and more particularly to method and apparatus for coping with surface cord, so that homogeneous glass is delivered to desired forming areas.

The homogeneity of molten glass from a glass delivery unit has always been considered important in order to eliminate cord in the resultant product and obtain good optical quality. The presence of cord is usually due to a variation in glass composition which may be produced by the volatility of the glass at the surface, with respect to the sub-surface glass, thus producing an inhomogeneous glass supply. In the past it has been common practice to employ stirring implements in the bowl and upstream in the forehearth in order to properly homogenize the glass stream and avoid the formation of cord. As an alternative, it has also been known to overflow or skim off the surface glass, by means of an overflow trough in the bowl area. Usually the overflow trough is positioned in the nose cord location which is in axial alignment with the longitudinal glass flow of the delivery unit. Neither the stirring nor the overflow methods of compensating for cord have been entirely satisfactory. That is, since the stirrer cannot usually be rotated rapidly enough to function correctly in the bowl, stirring does not eliminate surface volatility cord, but rather has a tendency to partially mix surface contamination with the body glass. Also, a pure skimming operation by an overflow system, on the other hand, increases the total glass requirements by the amount which is skimmed off.

SUMMARY OF THE INVENTION

Whereas the prior art concepts suggested thorough stirring to avoid cord or the skimming of the cord from the surface of the glass, the present invention sets forth a novel approach of coping with the cord by directing it toward a specific area in the forming process, wherein it will not be detrimental in the final article. That is, it has been determined that each location within the cross section of the glass delivery feeds a particular portion of an article formed therefrom, and accordingly it is an object of the present invention to orient the surface cord with a particular location in the glass delivery so as to direct the cord to a desired location in the formed article. For example, the cord may be directed toward an edge of the article which is subsequently trimmed, such as in sheet and ribbon glass, or toward a rim area which may be subsequently obscured or trimmed, such as in a panel or container.

A vane or barrier of any suitable refractory material, such as molybdenum or platinum-rhodium alloy is positioned within the bowl or well of the glass feeder with an orientation corresponding to that at which it is desired to have the cord exit the discharge opening. The vane neither rotates nor functions like a stirrer, but rather is a fixed member which is repositionable with any desired predetermined orientation in the bowl. Preferably, the vane extends from the central portion of the bowl outwardly toward the bowl walls, with the upper edge of the vane projecting above the glass surface and the lower edge terminating short of the bottom surface. When so positioned within the bowl, the surface volatility cord is intercepted by the vane and flows downwardly along opposite sides thereof so as to exit the feeder in a predetermined location within the discharge stream or gob.

It thus has been an object of the present invention to eliminate the need for bowl stirring and costly overflow of nose cord, through the utilization of surface cord glass by directing the same to a position within a formed article which will subsequently be removed or obscured, thus increasing glass utilization.

DESCRIPTION OF THE PREFERRED EMBODIMENTS

Figure 1:
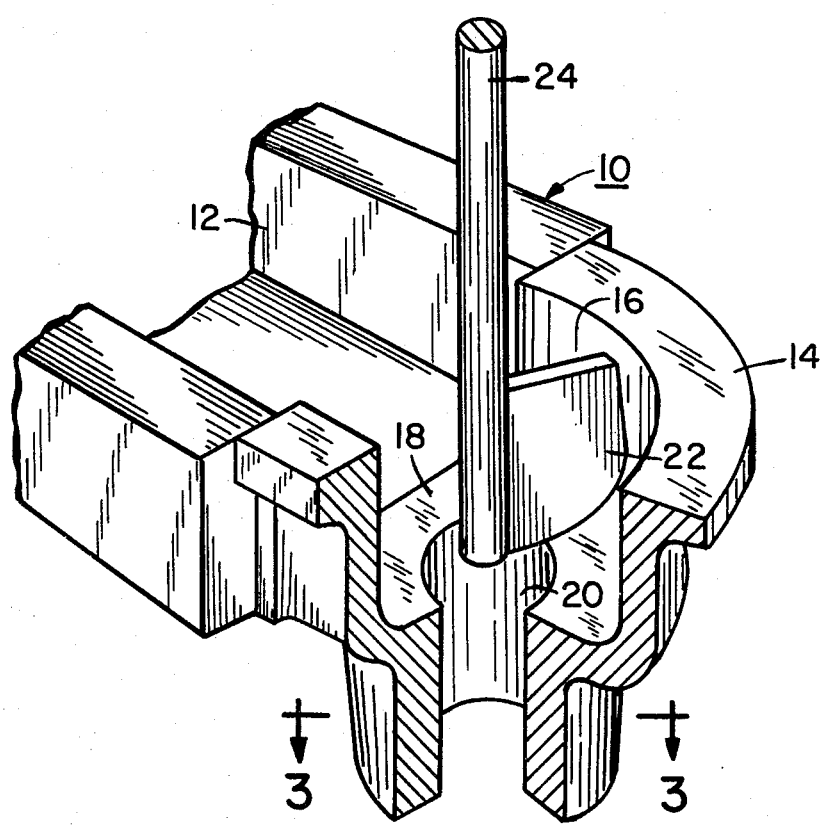
FIG. 1 is a fragmental perspective view, partially in section, of a feeder having a directional vane of the present invention mounted therein for orienting glass cord.
Figure 2:
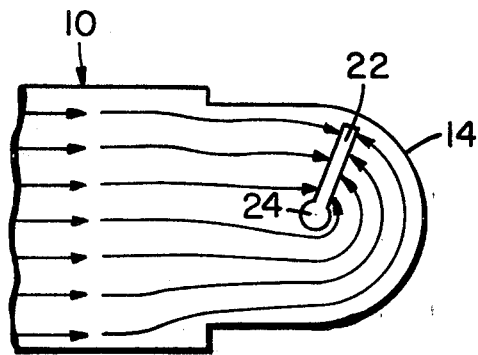
FIG. 2 is a somewhat schematic plan view of the device shown in FIG. 1 illustrating how the surface cord flow paths are intercepted by the directional vane.

Referring now to the drawings, and particularly FIGS. 1 and 2, a glass feeder 10, such as a forehearth or the like, is shown having a longitudinal delivery channel 12 communicating at its outer end with a bowl 14. The bowl is shown having curvilinear sidewalls 16 and a bottom surface 18 provided with a discharge outlet or delivery spout 20. A directional vane or barrier 22 is shown mounted upon a shaft 24 extending substantially centrally of bowl 14 and axially of discharge outlet 20.

Directional vane 22, as shown in FIGS. 1 and 2, is substantially planar and extends radially outwardly from a central portion of bowl 14 toward, but terminating short of, sidewalls 16. The bottom surface of directional vane 22 also terminates in spaced relation with respect to the bottom surface 18 of the bowl, while the upper surface of vane 22 projects above the surface of the molten glass in the bowl, so as to form a barrier and intercept the surface cord in the manner illustrated by the surface cord flow path arrows shown in FIG. 2. Mounting shaft 24 is pivotal so as to position directional vane 22 in a desired orientation within the bowl, such that the surface cord discharged therefrom will be delivered to a predetermined location in a subsequent forming operation. That is, the surface volatility cord follows the flow paths shown in FIG. 2, is intercepted in the bowl area by barrier 22, and flows downwardly along the opposed surfaces of the vane or barrier so as to exit the delivery spout in the same angular position as the barrier setting.

Figure 3:
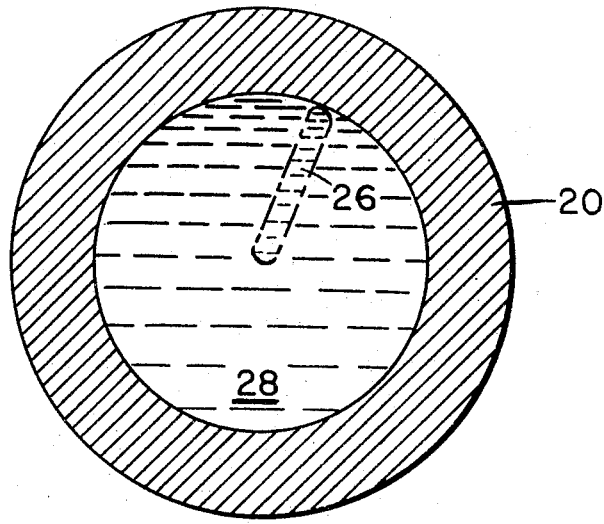
FIG. 3 is an enlarged sectional plan view of a stream of molten glass discharged by the device shown in FIG. 1, as viewed along line 3—3 thereof.

FIG. 3 illustrates a cross section of molten glass discharged through delivery spout 20, with the vane or barrier oriented in the angular position shown in FIGS. 1 and 2. That is, the surface cord glass 26 is oriented within the body glass 28 of the discharge, when viewed in horizontal cross section, in the same angular position as the vane setting. Since each angular location of the discharge feeds a particular portion of an article to be formed, the vane is oriented so that the cord glass will be directed to a portion of the article to be formed which will either be subsequently discarded or obscured in use. In the manufacture of sheet glass, for instance, the cord glass can be delivered to an edge portion of the sheet, which is normally trimmed off and accordingly its cord quality is of no importance. When a nose cord overflow was utilized in the manufacture of sheet, both the overflow glass and the edge portion glass were discarded, whereas in the present invention the two are combined, providing a resultant gain in glass utilization.

Figure 4:
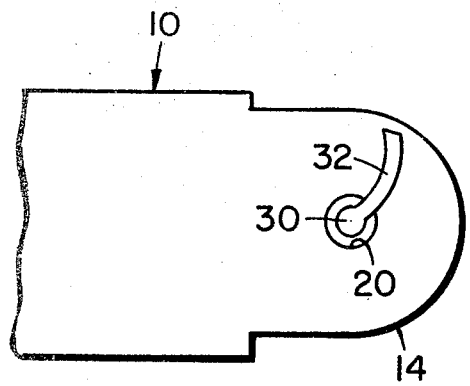
FIGS. 4 and 5 are somewhat schematic plan views of feeders incorporating various forms of directional vanes embodying the present invention.

Referring now to FIG. 4, a mounting shaft 30 is shown having a directional vane or barrier 32 representing a further embodiment of the invention. Directional vane 32, line vane 22, extends generally outwardly from a central portion of the well. However, vane 32 has been provided with curvilinear surface portions in order to inhibit any surface disruption which may occur with a planar vane and thereby permit the obtainment of a smooth stream-line laminar flow.

Figure 5:
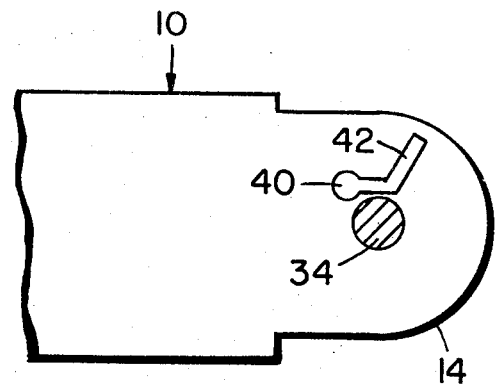

Referring now to FIG. 5, a further embodiment of the invention is shown wherein a flow control or stopper member 34 is positioned in the bowl 14 to control flow, and a mounting shaft 40 having an angular directional vane or barrier 42 is positioned slightly off center from the stopper 34. However, it should be noted that like planar vane 22, angular vane 42 extends outwardly toward the walls of the bowl 14 from a substantially central portion thereof.

Curvilinear directional vane 32 and angular directional vane 42 both function and operate in the same manner as planar vane 22. That is, the vanes extend above the surface of the molten glass retained in the bowl, and intercept the surface cord causing it to flow downwardly along the opposed surfaces thereof wherein it is discharged from the delivery unit in the same stream location as the angular position of the vane. Although all embodiments of the directional vanes are shown in the same orientation within the bowl, it should be understood that shafts 24, 30 and 40 are pivotal so as to fixidly re-position the vanes in virtually any orientation within the bowl proper. In addition, the various vanes may be interchanged among the various shafts so that vane 42 may be positioned concentric with the discharge orifice 20, whereas vanes 22 and 32 may be in a slightly off-set position such as shown in FIG. 5. In view of the fact that the vanes may be positioned on the center line or slightly off center, the invention is equally applicable to both gob feeders and stream feeders.

Although the now preferred embodiments of the invention have been disclosed, it will be apparent to those skilled in the art that various changes and modifications may be made thereto without departing from the spirit and scope thereof as defined in the appended claims.

We claim:

1. A method of delivering molten glass wherein molten glass is supplied to a glass delivery bowl and discharged downwardly below the surface of such supply through a delivery outlet, the improvement comprising the steps of intercepting surface cord on the molten glass in the bowl at a predetermined location, directing such cord downwardly through the molten glass within the bowl at such predetermined location, and discharging molten glass from the bowl with the surface cord in the same relative location in the glass discharge as the predetermined location in the bowl at which such cord was intercepted.

2. A method of delivering molten glass as defined in claim 1 including the steps of providing a barrier within the bowl area which projects above the surface of the glass retained therein for intercepting the surface cord, flowing such surface cord downwardly along wall portions of such barrier, and discharging molten glass from the feeder with the surface cord in the same orientation within the discharge as the orientation of the barrier in the bowl.

3. A method of delivering molten glass as defined in claim 2 including the step of intermittently discharging molten glass in the form of gobs.

4. A method of delivering molten glass as defined in claim 2 including the step of continuously delivering a stream of molten glass from the discharge outlet with the cord glass being located in a predetermined orientation relative to a horizontal cross-section of such stream.

5. A method of delivering molten glass as defined in claim 2 including the step of re-positioning the barrier within the bowl to obtain the discharge of the cord glass with a different predetermined orientation within the discharged glass.

6. Glass delivery apparatus including a substantially horizontal delivery channel communicating at one end with a source of molten glass and at its opposite end with a stationary bowl portion, said bowl portion having a bottom surface at substantially the same level as the bottom surface of said delivery channel, a downwardly open discharge outlet formed in the bottom surface of said bowl portion, static intercepting and directing means positioned within said bowl portion above said discharge outlet for intercepting surface cord on flowing glass supplied to said stationary bowl portion by said source of molten glass and for directing such surface cord downwardly so as to be discharged with a predetermined orientation within the flow delivered from the discharge outlet, said static intercepting and directing means including a fixed vane member, said vane member extending from a central position within said bowl substantially in axial alignment with said discharge outlet radially outwardly toward side wall portions of the bowl, said vane member having an upper edge projecting above the molten glass within said bowl and a lower edge terminating short of a bottom surface of such bowl, and means for positionably supporting said vane in a desired orientation with said bowl.

* * * * *